United States Patent [19]

Dittmar

[11] Patent Number: 5,211,517
[45] Date of Patent: May 18, 1993

[54] MACHINE FOR MAKING MICROGROOVES IN SNOW SKIS

[76] Inventor: Edbert E. L. Dittmar, 1290 NW. Mall St., Issaquah, Wash. 98027

[21] Appl. No.: 719,482

[22] Filed: Jun. 24, 1991

Related U.S. Application Data

[63] Continuation-in-part of Ser. No. 447,040, Dec. 7, 1989, abandoned.

[51] Int. Cl.$^5$ .............................................. B23D 1/26
[52] U.S. Cl. ................................. 409/296; 409/304; 409/335
[58] Field of Search .............. 409/296, 298, 326–328, 409/304, 323, 326, 335, 344, 218, 207, 209, 182, 189, 171, 125, 126, 120, 180, 184, 97, 110, 220, 121, 214, 103; 144/144 P, 136 R, 144 A, 137

[56] References Cited

U.S. PATENT DOCUMENTS

| | | | |
|---|---|---|---|
| 9,738 | 6/1881 | Prindle | 409/348 |
| 489,304 | 1/1893 | Grotz | 409/304 |
| 550,004 | 11/1895 | Morton | 409/332 |
| 2,178,440 | 10/1939 | Swanson | 409/171 |
| 3,442,309 | 5/1969 | Jentsch | 144/144 |
| 3,865,162 | 2/1975 | Schmidt | 144/144 |
| 4,561,814 | 12/1985 | Dahlgren, Jr. et al. | 409/189 X |
| 4,840,209 | 6/1989 | Reneau | 409/182 X |

*Primary Examiner*—Z. R. Bilinsky
*Attorney, Agent, or Firm*—David L. Tingey

[57] ABSTRACT

This invention describes a machine for the manufacture of small grooves in metal edge inserts typically found on the undersurface of snow skis. The machine produces ice-cutting blades by cutting grooves of approximate uniform depth a constant distance from the edge of the snow ski. With a ski positioned and secured with mounting clamps 21 so that a metal ski edge extends beyond a machine platten 10, a plurality of flattening clamps 23 flatten the typically bowed ski against a flat undersurface 22 of the machine platten 10. A cutting tool on a tool holder slidably mounted to a slide means on the platten upper surface then cuts into the metal ski edge following the curvature of the ski edge as it traverses the ski.

4 Claims, 5 Drawing Sheets

MACHINE FOR MAKING MICROGROOVES IN SNOW SKIS

This is a continuation-in-part of Ser. No. 07/447,040 filed in the United States Dec. 7, 1989 abandoned.

This invention relates to machines for the manufacture of snow skis, and more specifically to a machine that makes small grooves in metal edge inserts typically found on the undersurface of snow skis. The machine produces the grooves near and parallel to the edge of the snow ski and under the longitudinal location of the boot attachment.

BACKGROUND OF THE INVENTION

It is known in the art to have machines that make grooves in metal. However, skis are by design bowed and have curved edges, and previous cutting machines cannot obtain the necessary cut of constant depth in and parallel to the ski edge.

The present invention provides a machine that can cut skis that are not flat until mounted and flattened on the machine. Other cutting machines mount the metal to be cut on a platten or table top and assume that the article to be cut is flat already, thus no flattening clamps are needed or provided.

Both previous cutting machines and the present machine require and provide for 2-dimensional movement of the cutting tool so that curvilinear cuts may be made. However, if nonflat articles were to be cut by previous machines, the cut would not be of uniform depth because the machine cutting tool moves only in a plane parallel to the table top. If flattening clamps were added to these previous cutting machines so that the article would be flat for obtaining a cut of constant depth, the flattening clamps would necessarily be on the top surface of the machine platten or table where the article is mounted and would interfere with 2-dimensional slide movement, making the machines dysfunctional.

To overcome this design conflict of previous machines, the present invention mounts the ski and the mounting clamps on a platten undersurface—below the table. The undersurface is flat if the ski is to be flattened in a plane against the platten so that a cutting tool tracks the ski edge in 2 dimensions. The undersurface could be shaped otherwise, such as in the bow of the ski, if a side cut follower mounted to a tool holder on which the cutting tool is also mounted is biased against the ski edge and tracks the ski edge in 3 dimensions. A plurality of flattening clamps, or in general securing clamps, are also provided on the platten undersurface to secure the ski against the platten undersurface. A slide means to which the tool holder is mounted remains on the top of the machine platten, as with other machines, unobstructed by mounting clamps and securing or flattening clamps. The cutting tool on a tool holder then extends below the platten to the ski undersurface.

OBJECTS OF THE INVENTION

It is the object of the present invention to provide a machine that cuts microgrooves in metal outer edges typically found on the undersurface of curved and bowed snow skis.

It is the further object of the present invention that the microgroove cuts be of about constant depth and near and a constant distance from the ski edge, independent of inconsistencies or manufacturing imperfections in the shape of the ski edge, curvature of the ski edge, and alignments or mountings of skis, tools, or templates to obtain an ice-cutting blade defined between the microgroove cut and the ski edge of uniform thickness and depth.

SUMMARY OF THE INVENTION

A metal-cutting machine is described that mounts the ski to be cut on a flat platten undersurface. Mounting clamps and ski-flattening clamps are provide on the platten undersurface for securing and flattening the ski. A slide means to which a tool holder, common to many cutting machines, is on the top of the machine platten and thereby unobstructed by mounting and flattening clamps. The cutting tool on a tool holder then extends below the platten to the ski undersurface which, when mounted inverted, extends slightly beyond the perimeter of the platten, presenting the undersurface ski edge upward to the cutting tool.

DESCRIPTION OF THE PREFERRED EMBODIMENT

Figure 1:
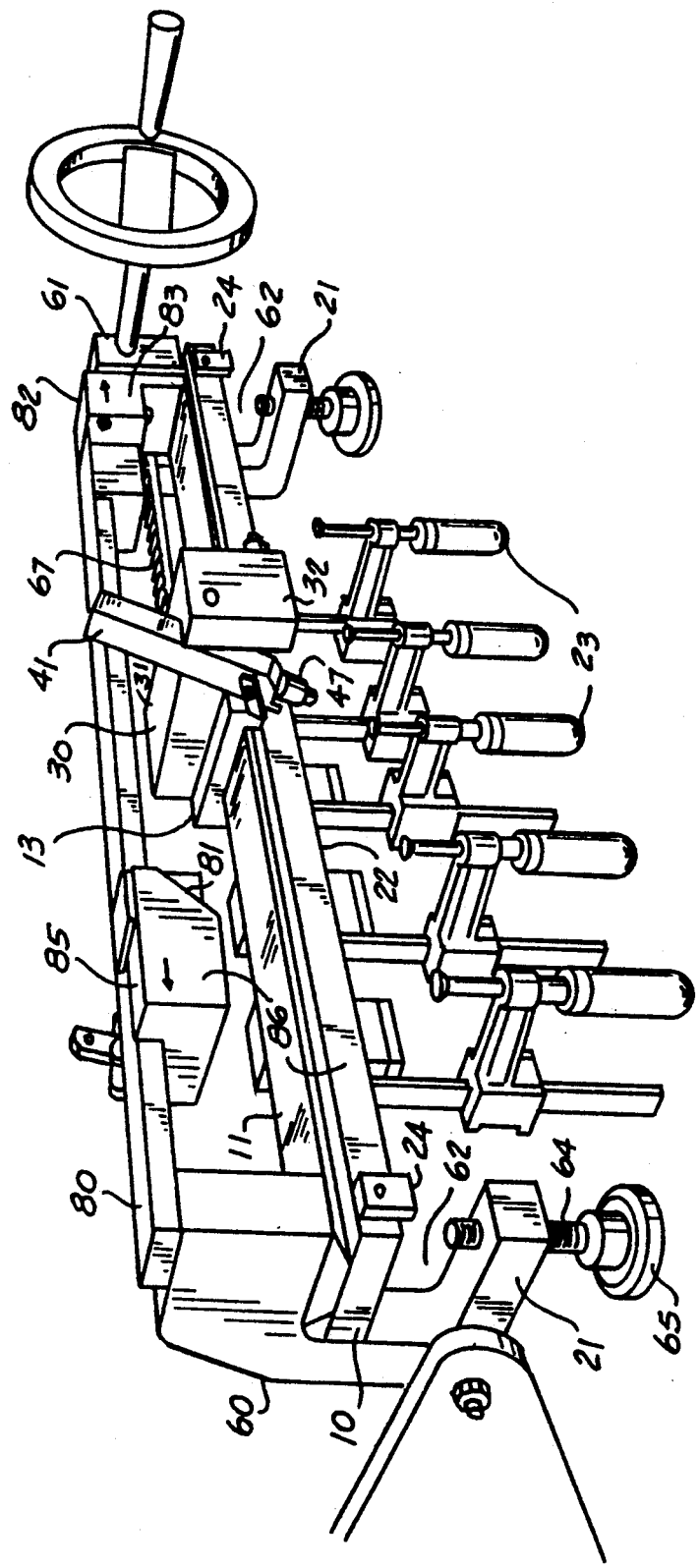
FIG. 1 is a front perspective view of the grooving machine.
Figure 2:
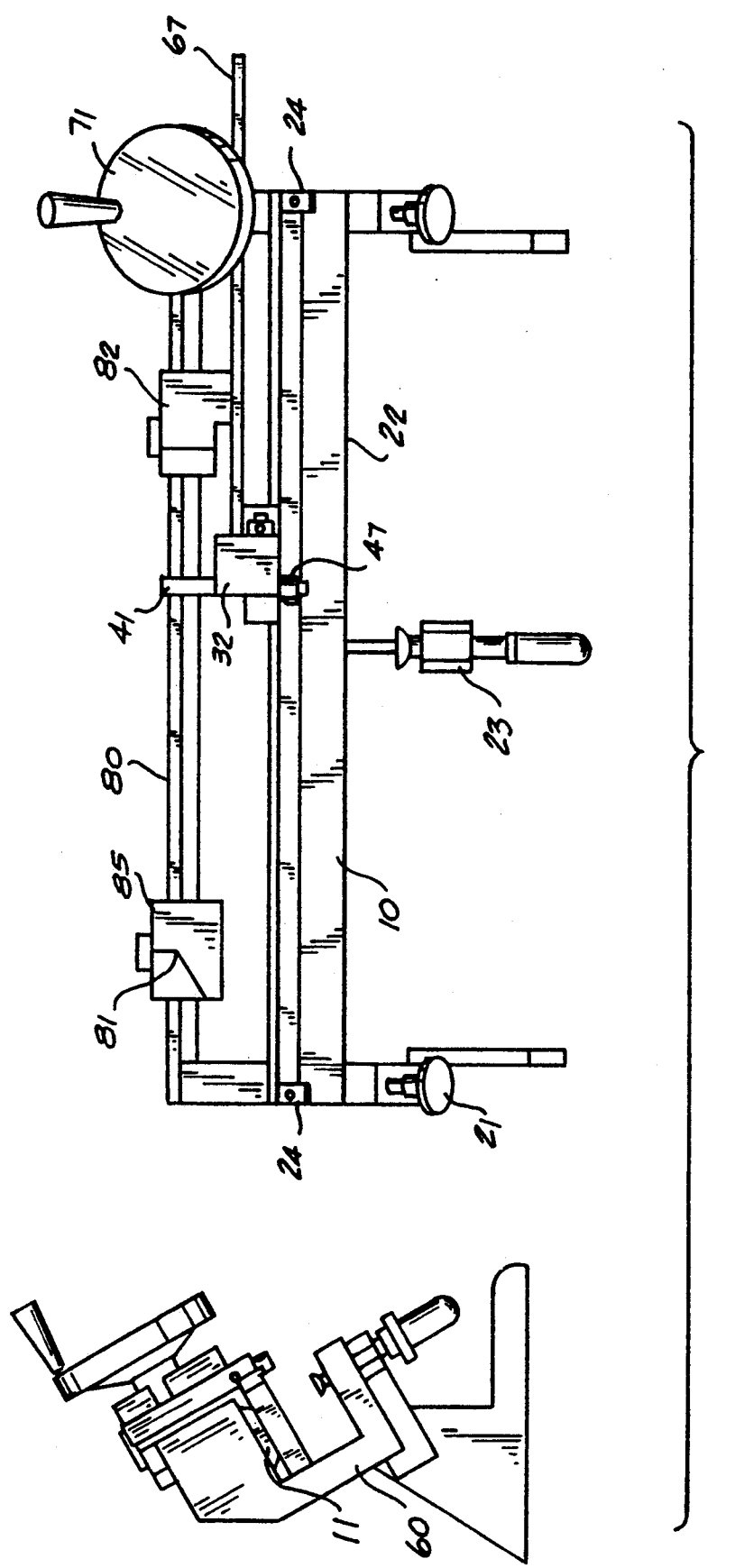
FIG. 2 is a front and side view of the grooving machine.

Referring to FIG. 1 and FIG. 2, the present invention, in its usual configuration, comprises a platten 10 with a flat undersurface to which a ski is mounted, the ski undersurface in face to face relation with the platten undersurface, a plurality of flattening clamps 23, mounting clamps 21, and a tool carriage 30. In an alternate embodiment, the undersurface may be otherwise shaped, such as in the bow of a ski with the "flattening" clamps still securing the ski against the platten undersurface. The clamps are all on the undersurface 22 of the platten 10, providing a mounting clamp on either end of the platten 10 to initially place a ski to be grooved. The plurality of flattening support clamps 23 are placed between the mounting clamps which, in the primary embodiment, flatten the ski against the platten, removing the prototypical ski bow from end to ski end. The ski edge is secured against ski locating stops 24 on each end of the platten to properly and consistently locate the ski edge relative to the platten 10 with the ski edge extending beyond the platten, providing upward exposure of the ski edge with the balance of the ski undersurface firmly secured against the platten undersurface 22. The flattening clamps 23 may be sliding Jorgensen clamps. In the alternative, clamps may be powered means of clamping such as by pneumatic, hydraulic, or electrical motor action.

Figure 6A:
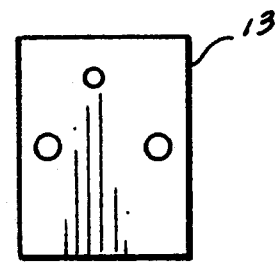
FIG. 6a and FIG. 6b, collectively referred to as FIG. 6 in the specification, are top and end views of the tool slide.
Figure 6B:
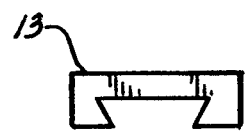

On the platten 10 is a slide base 11 mounted along the platten longitudinal center line with a plurality of screws extending essentially the length of the platten. The sides of the slide base 11 are tapered inward from top surface to bottom surface. A tool slide 13 as shown in FIG. 6, essentially a rectangular block with a channel down its length, the channel sides tapered to match the slide base side taper, is inserted over the slide base 11, the slide base fitting within the tool slide channel. The width of the channel is larger than that of the slide base 11, and between both sides of the slide base and channel is inserted a gib to maintain a given position of the tool slide 13 over the slide base 11 while allowing the tool slide to slide over the slide base. A plurality of screws attach the tool carriage 30 to the tool slide 13.

Figure 3:
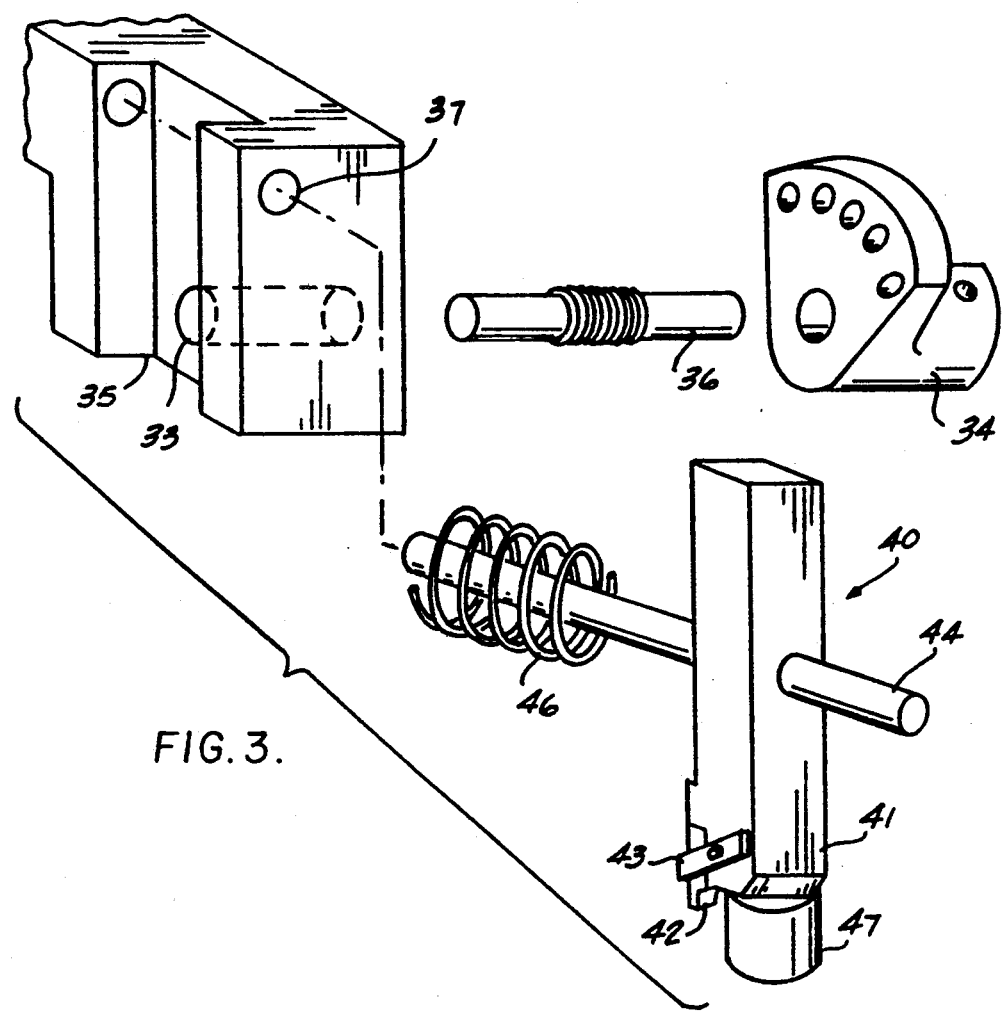
FIG. 3 is a perspective view of tool carriage assembly.
Figure 5A:
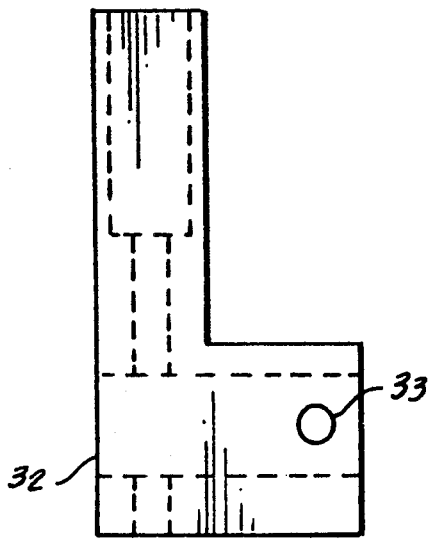
FIG. 5a, FIG. 5b, and FIG. 5c, collecively referred to as FIG. 5 in the specification, are top, side, and front views, respectively, of the tool carriage.
Figure 5B:
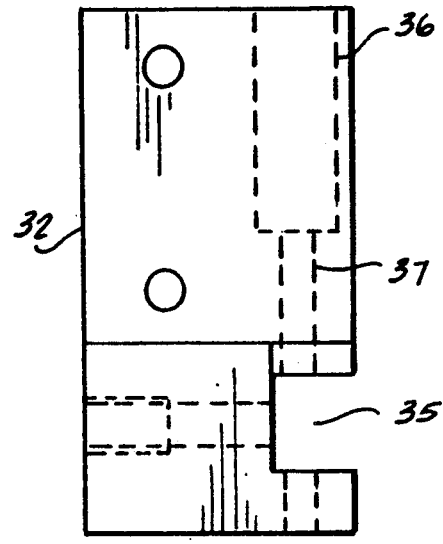
Figure 5C:
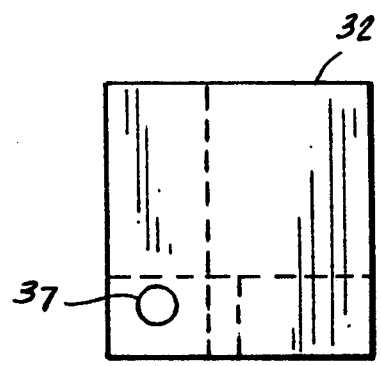

Referring to FIG. 3 and FIG. 5, a tool carriage mounting section 31 mounts over the tool slide 13 and a carriage tool section 32 extends toward the front of the machine and down toward the ski position. Through the tool section 32 and parallel to the longitudinal axis of the slide base 11 when the tool carriage 30 is mounted is a first threaded hole 33, as shown in FIG. 2. In the tool section 32 is a vertical rectangular channel 35 on its side surface forward of the mounting section through which the first threaded hole 33 passes with intersecting center lines. From the rearward side of the mounting section 31 toward the front of the tool section 32 is a cylindrical bore 36. Concentric with the cylindrical bore 36 and smaller in size is a cylindrical hole 37 continuing from the end of the bore 36 through the rectangular channel 35 to the front of the tool section 32, its center line intersecting with the center line of the channel 35.

Into the first threaded hole 33 is mounted an adjusting dial 34 attached to a threaded rod 36 as shown in FIG. 3., the threaded rod 36 passing into the tool carriage rectangular channel 35. The dial 34 when rotated screws the rod into the threaded hole 33 and adjusts the longitudinal extension of the rod 36 into the rectangular channel 35.

Figure 9A:
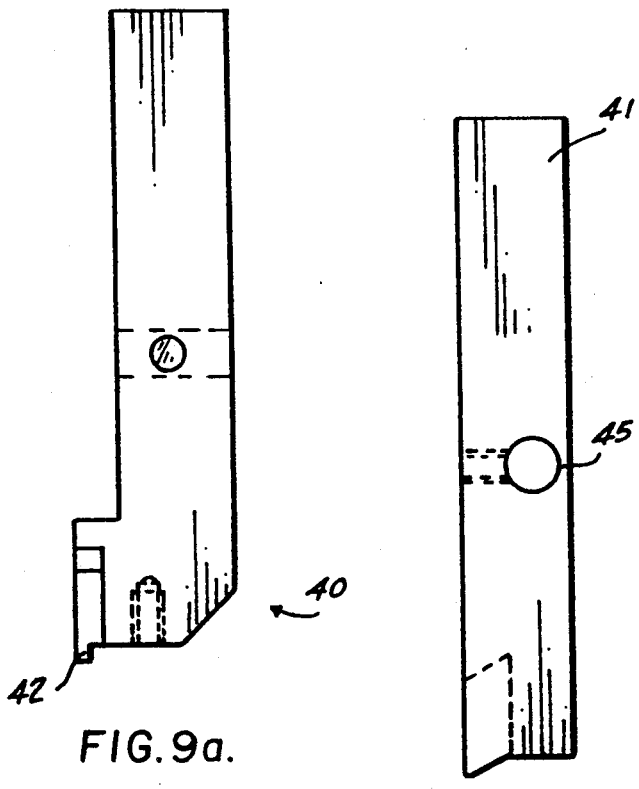
FIG. 9a, FIG. 9b and FIG. 9c, collectively referred to as FIG. 9 in the specification, are front, side, and bottom views, respectively, of the cutting tool assembly.
Figure 9B:
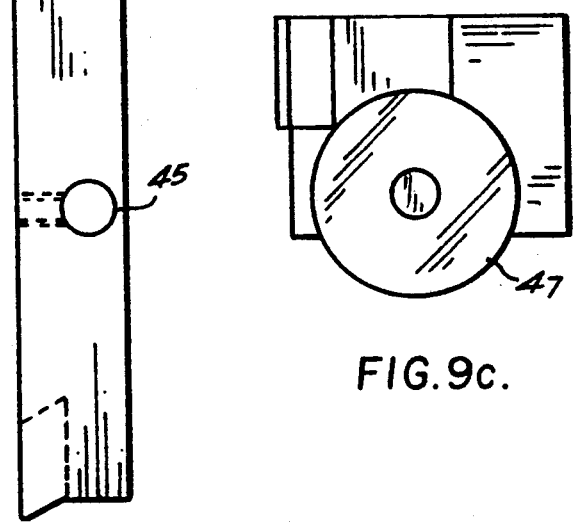
Figure 9C:
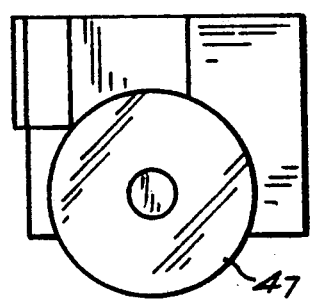

As shown in FIG. 3, in the tool carriage rectangular channel 35 is mounted a tool holder 40, also shown in FIG. 9, comprising a tool mounting bar 41, a cutting tool 42, and a mounting bracket 43. The tool mounting bracket 43 firmly positions and retains the cutting tool 42 in place at the end of the tool mounting bar 41. The assembly may be a TopLok (Trademark) tool assembly by Sandvik Coromant. The tool holder 40 is held in place in the tool carriage rectangular channel 35 by a bar mounting pin 44 inserted into the cylindrical bore 36 and through the cylindrical hole 37 in the tool carriage 30 passing through a hole 45 in the top end of the tool mounting bar 41 as it extends upward and out of the tool carriage channel 35, the bar 41 pivotably hanging from the mounting pin 44 in the upper portion of the channel and resting against the adjusting rod 36 such that, with the cutting tool extending down from the tool mounting bar 41, when the adjusting dial 34 pushes the rod 36 further into the channel 35 and against tool mounting bar 41 pivoting from the bar mounting pin 44, the tool 42 is elevated away from the ski mounted below the bar. Conversely, when the rod 36 is withdrawn into the carriage 30 and the bar 41 is allowed to rotate downward, the cutting tool 42 extends into the surface of the mounted ski. When the tool carriage 30 is slid along the slide base in the cutting direction, the cutting tool 42 and the bar 41 is pushed firmly against the adjusting dial 34. The position of the rod 36 is increasing withdrawn from an initial position where the cutting tool 42 slightly cuts the ski surface to the full extent after several passes where the tool 42 fully extends into the ski edge and cuts a groove of the required dimension. The tool bar mounting pin 44 is mounted into the cylinder bar 41 with a spring 46 to allow the pin 44 and bar 41 to move transversely within the rectangular channel 35.

A side cut follower 47 is rigidly mounted to the tool mounting bar 41 in close proximity to the cutting tool and biased against the edge of the mounted ski edge so that the cutting tool tracks the ski edge curvature, assuring that the machine produces a cut a constant distance from the ski edge and with the same curvature as the ski edge. As the tool carriage 30 slides along the slide base 11, the side cut follower 47 maintains a constant distance of the cutting tool 42 from the ski edge by following the actual side contour of the mounted ski rather than a template thus assuring a cut in the pattern of the ski edge as opposed to a pattern of a template. In the alternative embodiment of a not flat platten undersurface, such as in the shape of the bow of a ski (not shown), the side cut follower and tool holder can be similarly configured and mounted such that the side cut follower and cutting tool track the ski edge in three dimensions.

Figure 7:
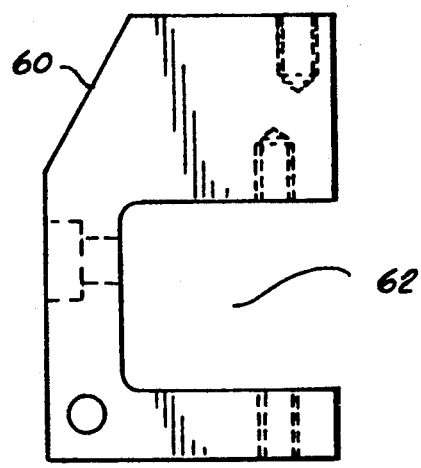
FIG. 7 is side view of the left end bracket.
Figure 8:
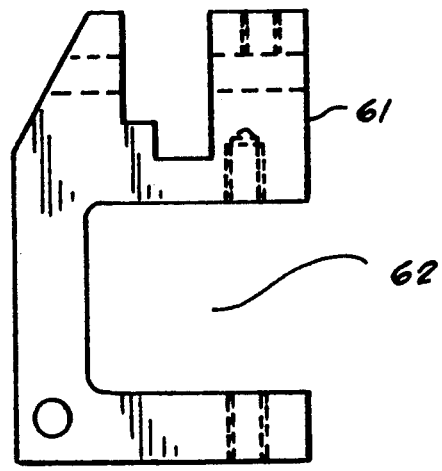
FIG. 8 is side view of the right end bracket.

On the ends of the platten 10 are a left end bracket 60 and a right end bracket 61, respectively, shown in FIG. 1, FIG. 7, and FIG. 8. Each end bracket has a large lower horizontal channel opening 62 to the front of the machine through which the platten 10, slide base 11, and mounted ski passes. Through a threaded hole 63 in the bottom of each bracket and ending in the channel area is a threaded rod 64 with a handle 65 on its lower end which comprises the first and second ski clamps, respectively.

Figure 4:
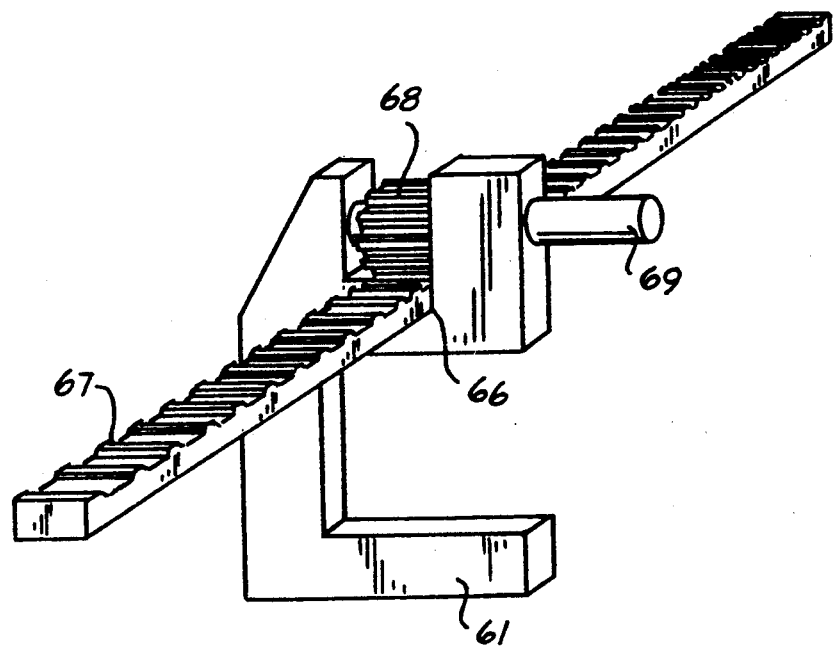
FIG. 4 is a perspective view of gear rack and pinion gear in right end bracket.

Referring to FIG. 4, in the right end bracket 61 is a small upper channel 66 opening upward into which fits a carriage transport gear rack 67. A pinion gear 68 inserts into the small upper channel 66 over the transport gear rack 67 meshing with the gear rack and is secured by a transport rod 68 passing through the right end bracket 61 and through the pinion 68 in its small upper channel 66, allowing the transport rack 67 to slide through the bracket as the pinion rotates. With one end of the transport gear rack 67 passing through the small channel of the right end bracket 61, the other end is connected to the tool carriage 30 in the mounting section of the tool carriage. The pinion 68 is firmly attached to the transport rod 69 which extends beyond the front of the right end bracket 61, onto which is secured a hand wheel 71 such that when an operator rotates the hand wheel turning the pinion, the transport gear rack moves the tool carriage along the base slide. In the alternative, the movement of the slide carriage can be powered, for example, with pneumatic, hydraulic, or electrical controls.

Mounted to the tops of the end brackets and extending between them is a support bar 80. Adjustably attached to the support bar 80 are a left end stop 85 and a right end stop 82, which defines the left and right limits of travel for the tool carriage 30, respectively. Integral with the left end stop 85 is a tool retract section 81 which causes the cutting tool 42 on the tool bar 41 to rotate upward on the tool bar mounting pin 44, retracting the cutting tool from the ski edge, as the upper end of the tool bar impacts the tool retract section.

Gradations 86 on the left end stop and on the platten are coordinated with temporary marks placed on the ski to adjust the position of the left end stop 85 according to the ski length, maintaining proper longitudinal position of the grooves for various ski lengths. Gradations 83 on the right end stop 82 are provided to denote preferred position of the right end stop for different ski types, such as recreation skis or racing skis, which require the grooves to be located in different longitudinal positions. Gradation marks vary for use with left or right skis.

It is not previously known to have a machine that makes very small grooves in metal edge of a ski comprising a platten onto which a ski is positioned and aligned on the platten undersurface 22; a plurality of flattening clamps 23 in addition to mounting clamps 21 to flatten and rigidly hold a ski against the platten undersurface 22; a tool holder 40 extending from a slide means on the platten top surface to the ski edge mounted on the platten undersurface 22; and a cutting tool 42 mounted on a side cut follower so the cutting tool is guided by the actual curvature of the ski edge as opposed to a template.

What is claimed is:

1. A machine for cutting metal inserts characteristically found on the undersurface of snow skis at their outer edges, comprising a platten having a flat underside against which a ski may be flattened so that a ski insert to be cut may be positioned to extend slightly beyond the platten, clamping means for mounting a ski to the platten,
    a slide means on the platten,
    a cutting tool holder slidably attached to the slide means,
    a plurality of flattening clamps spaced apart along the platten undersurface for flattening a ski against said platten undersurface,
    a cutting tool mounted to the tool holder and extending below the platten undersurface for cutting a groove of approximate uniform depth in the flattened ski mounted on the platten undersurface when the tool holder traverses the platten on the slide means.

2. A grooving machine as in claim 1, further comprising a side cut follower rigidly mounted to the tool holder in close proximity to the cutting tool and biased against the edge of the mounted ski so that the cutting tool tracks the ski edge curvature, assuring that the machine produces a cut a constant distance from the ski edge and with the same curvature as the ski edge.

3. A machine for cutting metal inserts characteristically found on the undersurface of snow skis at their outer edges, comprising a platten having an underside surface against which a ski may be secured with a ski insert to be cut positioned to extend slightly beyond the platten, clamping means for mounting a ski to the platten,
    a slide means on the platten,
    a cutting tool holder slidably attached to the slide means,
    a plurality of securing clamps spaced apart along the platten undersurface for securing a ski against said platten undersurface,
    a cutting tool mounted to the tool holder and extending below the platten undersurface for cutting a groove of approximate uniform depth in the ski securely mounted on the platten undersurface when the tool holder traverses the platten on the slide means,
    a side cut follower rigidly mounted to the tool holder in close proximity to the cutting tool and biased against the edge of the mounted ski so that the cutting tool tracks the ski edge curvature, assuring that the machine produces a cut a constant distance from the ski edge and with the same curvature as the ski edge.

4. The invention of claim 1 or claim 3 further comprising a support bar mounted to the platten above its upper surface,
    a left end stop and a right end stop attached to the support bar in spaced apart relation defining between them left and right limits of travel for the tool holder, respectively,
    a tool retract surface on the left or the right end stop which the cutting tool holder contacts upon sliding to the limiting end stop,
    means for causing the tool holder to rotate away from the ski surface upon contact of the tool holder on an end stop.

* * * * *